United States Patent [19]

Balachandran et al.

[11] Patent Number: 5,481,571
[45] Date of Patent: Jan. 2, 1996

[54] METHOD AND APPARATUS FOR SWITCHING BETWEEN RADIO FREQUENCY CIRCUITS

[75] Inventors: Kumar Balachandran; Roy F. Quick, Jr., both of San Diego, Calif.

[73] Assignee: Pacific Communication Sciences, Inc., San Diego, Calif.

[21] Appl. No.: 150,728

[22] Filed: Nov. 12, 1993

[51] Int. Cl.$^6$ ................................................. H04B 17/02
[52] U.S. Cl. .......................................... 375/347; 455/134
[58] Field of Search ..................... 375/100, 39; 455/133, 455/134, 135, 277.1, 277.2; 343/876

[56] References Cited

U.S. PATENT DOCUMENTS

| | | | |
|---|---|---|---|
| 4,450,585 | 5/1984 | Bell | 455/135 |
| 4,499,606 | 2/1985 | Rambo . | |
| 4,742,567 | 5/1988 | Ohe et al. . | |
| 4,756,023 | 7/1988 | Kojima | 455/134 |
| 4,977,616 | 12/1990 | Linder et al. . | |
| 5,119,501 | 6/1992 | Perry et al. | 455/134 |
| 5,152,009 | 9/1992 | Sato | 455/134 |
| 5,168,574 | 12/1992 | Gordon et al. . | |
| 5,203,026 | 4/1993 | Ekelund . | |
| 5,204,980 | 4/1993 | Sharples . | |
| 5,241,693 | 8/1993 | Kim et al. . | |
| 5,390,342 | 2/1995 | Takayama et al. | 455/134 |

FOREIGN PATENT DOCUMENTS 0210792  2/1987  European Pat. Off. .

OTHER PUBLICATIONS

Patent Abstracts of Japan, vol. 11, No. 231, Jul. 28, 1987 and JP A,62 047 222 (NEC) Feb. 28, 1987.
Predictive Antenna Selection Diversity (PASD) for TDMA Mobile Radio,—Proceedings of 1991 International Conference on Communications—ICC'91, Jun. 23–26, 1991.

*Primary Examiner*—Stephen Chin
*Assistant Examiner*—Timothy J. May
*Attorney, Agent, or Firm*—Lowe, Price, LeBlanc & Becker

[57] ABSTRACT

An RF circuit switch system having particular use in an antenna diversity scheme for a CDPD system relies upon a comparison between current signal values on a selected antenna and a predetermined value based upon previous signal values measured on the same antenna. This comparison determines whether switching will occur from one antenna to another. Normally, the predetermined value will be adjusted based upon present signal strength on the selected antenna. Switching is normally attempted when there is a drop of approximately 10 dB in the signal strength of the selected antenna. If the signal strength in the other antenna is found to be less than that of the original antenna upon switching, an automatic switch back is carried out.

14 Claims, 7 Drawing Sheets

METHOD AND APPARATUS FOR SWITCHING BETWEEN RADIO FREQUENCY CIRCUITS

This application is related to U.S. patent application Ser. No. 08/117,913, filed Sep. 8, 1993, and U.S. patent application Ser. No. 08/152,005, filed Nov. 12, 1993, (designated Attorney Docket No. 2167-002 and entitled "CELLULAR DIGITAL PACKET DATA MOBILE DATA BASE STATION"). This application incorporates by reference those two applications in their entirety.

1. Technical Field

This invention relates generally to techniques for switching RF circuitry. More particularly, this invention relates to an antenna diversity scheme for a cellular digital packet data(CDPD) system.

2. Background of the Invention

Radio frequency circuits such as "front-end" circuits including antennas, duplexers, filters and amplifiers are often arranged so that a single "front end" RF circuit is switched between a number of source circuits or a source circuit is switched between a number of "front-end" circuits having different characteristics. Such techniques are generally based upon received signal strength indication (RSSI) on at least one RF circuit. These techniques and their criteria for controlling circuit switching range from the extremely simple to the extremely complex, requiring advanced processors to carry them out.

A major disadvantage of any data transmission is the probability of data loss during transmission (also known as block error probability) due to a number of different environmental conditions. Such conditions include but are not limited to atmospheric disturbances, the intervention of objects between the transmitting station and the receiving station, fading caused by multipath propagation, and movement of one of the stations.

This latter condition is quite common when a cellular phone system is being used in conjunction with a data transmission system since the system is designed for mobile applications.

Consequently, even if a subscriber unit is relatively stationary, even slow or slight movements of the transceiver equipment associated with the subscriber data terminal can cause data loss. This problem is enhanced when the subscriber is operating in a moving vehicle. An example of a data terminal which can be "docked" in a vehicle having AMPS equipment is described in U.S. application Ser. No. 08/117,913.

The human analog voice was the signal that the AMPS system was first designed to communicate. The AMPS system was optimized for carrying as many analog voice signals within a given bandwidth of a channel as possible. Mobility of the cellular telephone using low power mobile units, FM modulation,and the higher carrier frequency range (800 MHz–900 MHz) is achieved through a cellular arrangement of antennas whereby a user's signal is handed off to the next cell site as he or she moves into a different cell area. This cellular handoff can cause a temporary loss in transmission or reception. However, temporarily losing a voice signal is not critical because a user knows when there is a signal loss and can retransmit the voice information. However, signal loss, even though temporary, poses special problems for transmission of digital data. Some other mobile cellular problems causing a loss in a voice signal are fading signal strength, reflections, Rayleigh fading, and cellular dead spots.

The availability of portable computers naturally led to the desire to transmit digital data via wireless from a remote location. Presently, the AMPS voice cellular system is being used to transmit digital data in the form of Circuit Switched Cellular Data across AMPS carrier channels. Raw (baseband)digital data is converted so that it can be transmitted and received across the analog AMPS system. One disadvantage to using the AMPS system is that errors in transmission limit the baud rate of transmitting and receiving digital data. Also the AMPS was designed to communicate analog voice signals and is not suited to effective data communication. Another disadvantage of using AMPS to communicate digital data is that movement of the subscriber unit may cause a cellular handoff to occur, thus causing a loss of the digitally transmitted or received information. Loss of digital data may corrupt a data file such that it is useless. Other losses of the raw digital data may be caused by other problems of the AMPS mobile cellular system.

Data transfer is particularly difficult in a non-stationary or mobile environment since sudden decreases in signal strength of 40–50 dB (a reduction by factor of 10,000 to 100,000) in a fraction of a second is frequently experienced. If the mobile station is in a fast-moving automobile in an urban environment, dozens of significant fades (20 dB or more)may be experienced every second. The receiver in a mobile environment must deal with not only noise, but interference from other transmitters on the same channel or nearby channels. During a fade, the desired signal may suddenly become vastly weaker than an undesired, interfering signal from a distance cell-site operating on the same channel, and the receiver may lock in on the undesired signal.

In a digital system, the effects of noise and interference in a mobile channel cause a dramatic increase in the bit-error rate (BER). The BER in the mobile channel may typically run up to one million times higher than in a non-verbal point-to-point digital radio communication. It is very different from the virtually error-free digital transmission which can be engineered in a wire line environment. Voice coders, modulators and de-modulators and synchronization schemes which work well enough on wire line digital systems like T-1 trunks or point-to-point microwave radio systems, may simply disintegrate in the mobile environment. Additional discussion of the effects of a mobile environment on digital communication can be found in the publication "Digital Cellular Radio", by George Calhoun, Chapter 8, pp. 199–235 herein incorporated by reference as Reference II.

The use of a facsimile device with an AMPS system is also considered desirable, but is extremely problematical because of the aforementioned problems regarding data transmission with a mobile station. The most critical factors being fading due to loss of signal strength and temporary loss of a transmission channel due to hand-off or other RF circuit switching. Successful data transmission of, for example facsimile, using existing AMPS systems require that gain be stabilized above certain minimum levels and that switching be controlled so as to limit interruption of data flow. Existing arrangements for transmitting data over AMPS systems are unable to assure control of these two vital parameters.

BRIEF SUMMARY OF THE INVENTION

An object of the present invention is to efficiently switch between RF circuits to obtain optimum gain in a cellular mobile radio system.

A further object of the present invention is to carry out an antenna diversity technique to mitigate the effects of signal fading.

A further object of the present invention is to carry out an antenna diversity method to optimize gain in a data transmission system.

Still another object of the present invention is to carry out an antenna diversity method in a data transmission system to lower the probability of lost data.

The aforementioned objects are carried out using a method of switching between two RF circuits having different characteristics. The method includes detecting present strength of a signal on a selected RF circuit and determining a maximum signal value based upon detected signal strength on the selected RF circuit. The method also includes the steps of determining a threshold value and a hysteresis value, and then combining maximum signal value with the threshold value and the hysteresis value to obtain a predetermined value which is compared with the present signal strength on the selected RF circuit. Switching to another RF circuit takes place if the present signal strength is less than the predetermined value.

Another aspect of the present invention includes an antenna diversity system having at least two antennas with different characteristics, and a switch arranged to select between one of the two antennas for active use with an RF circuit. A signal strength detector is arranged to detect signals from a selected antenna and feed the signals to a processor. The processor generates control signals for selecting one of the antennas based upon an evaluation of present signal strength comparison. The processor evaluates the present signal strength by comparing it to a predetermined value derived from previous signal strength measurements, a predetermined threshold and a predetermined hysteresis value.

DETAILED DESCRIPTION OF THE PREFERRED EMBODIMENTS

One solution for dealing with the problems of mobile data transmission systems resides in the use of diversity as defined in the publication "Antenna Diversity" by R. F. Quick, Jr. and Kumar Balachandran, dated May 10, 1993, herein incorporated by reference as Reference I. Diversity refers to any of several techniques for sampling the received signal more than once, and by either combining these signals or selecting the best of them, improving the signal-to-noise ratio at the receiver. In order to counteract the fading problem the samples must be taken in such a way that the fading characteristics of the different samples are uncorrelated.

The most common form is known as space diversity, which in layman's terms means simply having two or more antennas separated by a minimum of half a wave length (several inches at 800–900 MHz). Two antennas so separated will show uncorrelated fading patterns; if one antenna is in a deep fade it is quite unlikely that the other antenna is also in a fade. The radio circuitry can be programmed to select the antenna branch with a better signal. The more branches the better the average overall signal (as indicated in the publication 37 Digital Cellular Radio", by George Calhoun, Chapter 8, pp. 199–221, herein incorporated by reference as Reference II).

Many types of antenna/combiner systems, capable of producing space diversity, have been analyzed. In one study, an 8-branch diversity system at the mobile unit was found to be capable of assuring that the received signal will be within 3 dB of its normal value 90% of the time. In other words, it is possible through multiple-antenna systems to reduce the effect of fast Rayleigh fadings below the magnitude of slow, shadow-induced fading which multiple antennas do not help. A more important aspect of diversity may be that it significantly reduces co-channel interference by reducing FM capture of the interfering signal.

Figure 1:
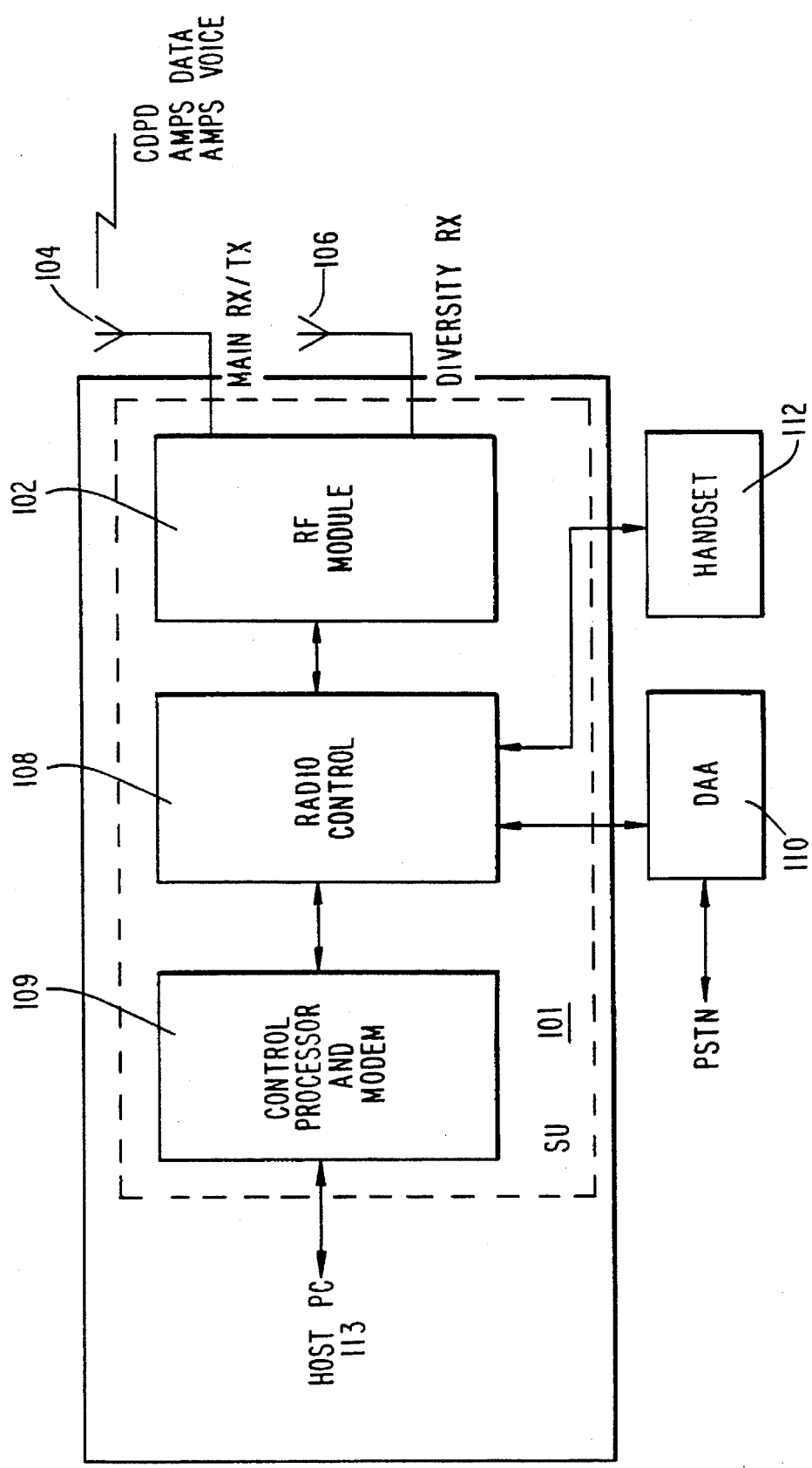
FIG. 1 is a block diagram of a Mobile End System (MES) having a subscriber unit (SU) which can benefit from the present invention.

However, the cost of the equipment and the increased complexity of the circuitry necessary to deal with eight separate antenna inputs constitute additional overhead. For example, FIG. 1 illustrates a circuit diagram of an hand held MES having an integrated subscriber unit for a cellular digital packet data (CDPD) system such as that described in U.S. patent application Ser. No. 08/117,913. This unit uses a main antenna 104 for both transmission and reception, of both data and voice communication. The second antenna 106 is relied upon only for reception, and can be used as part of the antenna diversity scheme of the present invention. The other elements illustrated in FIG. 1 are part of the transceiver unit described in that application. Switching between the two antennas 104, 106 is carried out in the RF module, and the programming necessary to initiate the switching between antennas is carried out in the radio control module 108.

Figure 2:
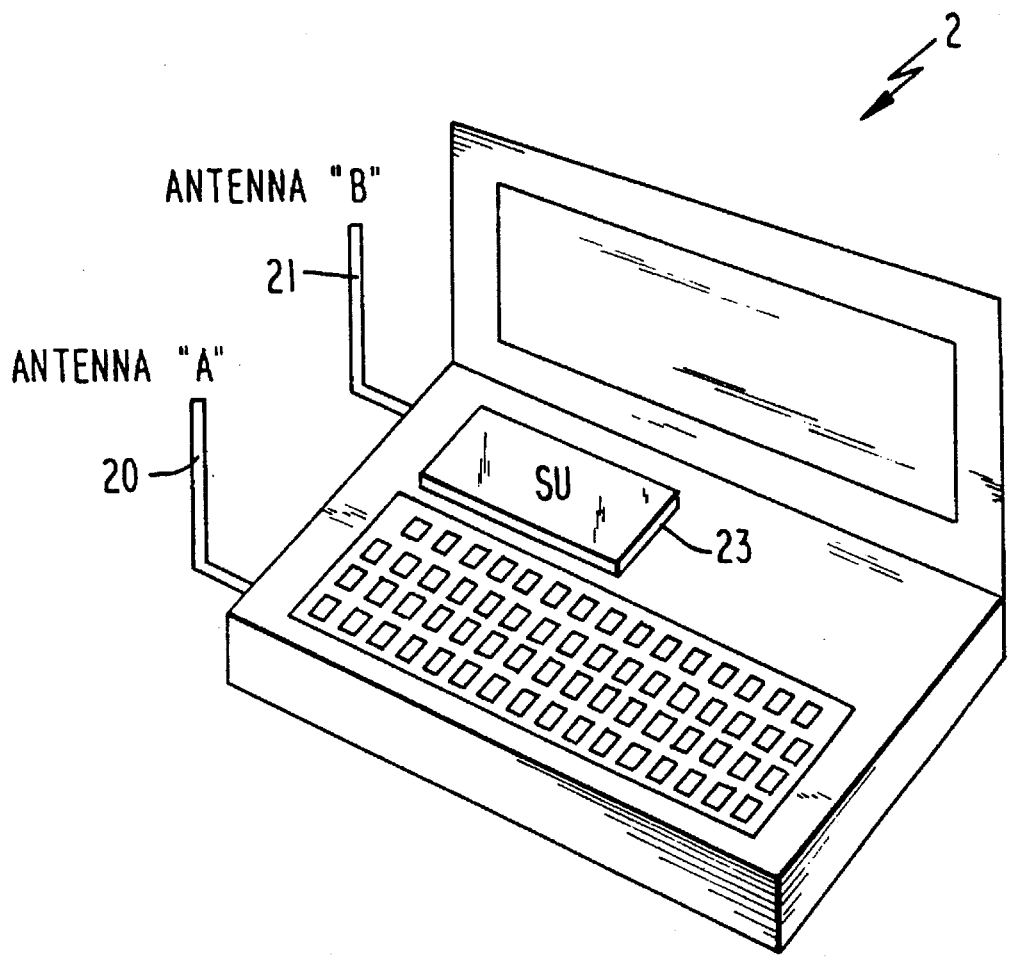
FIG. 2 is a perspective diagram of a Mobile End System (MES) having two antennas and a subscriber unit (SU) which can use the present invention.

A modification of the arrangement illustrated in FIG. 1 is shown in FIG. 2. In this arrangement, a mobile end system 2 contains a subscriber unit 23 similar to that illustrated as 101 in FIG. 1. The mobile end system 2 of FIG. 2 is a data terminal or host PC into which subscriber unit 23 is contained. The MES 2 has a first antenna 20 and a second antenna 21. Alternatively the antennas could be designed differently such that one would be contained within the MES chassis. A chassis antenna and a raised antenna 21 can benefit by the antenna diversity method of the present invention in order to eliminate external antenna components. Furthermore space may be saved within the chassis because a smaller chassis antenna may be used. FIG. 1 illustrates a block diagram of the circuits contained in the MES 2 of FIG. 2. The subscriber unit (SU) 101 contains a processor/modem 109 which interfaces to the host PC or data terminal 113 using baseband digital signals and modulates/demodulates these signals for wireless transmission/reception via the radio control 108, RF module 102, and antennas 104, 106. Analog voice signals can be received and transmitted from handset 112, radio control 108, RF module 102, and antennas 104, 105. Other signals may be transmitted or received onto the public telephone switching network (PTSN) through data access arrangement (DAA) 110 such as that similar to present day Hayes compatible modem. Other types of data such as CDPD, Circuit switched cellular, AMPS voice can be transmit and received through the RF module 102, antennas 104, 106, airwaves and then to or from a mobile data base station (MDBS) or AMPS base station.

A key feature of any antenna diversity system is that the antennas being selected have different operational characteristics, even if these are merely different mounting positions resulting in different gain characteristics. Otherwise, there would be no point to selecting between antennas since all the antennas available would have the same gain characteristics under the same circumstances.

One approach to switching criteria in an antenna diversity system is to maximize the signal gain from the multiple antenna circuits available. (Usually two antenna circuits are used.) In such a system, readings are taken immediately after a switch to a new antenna circuit. If the signal strength reading is less than that on the old circuit, an immediate switch back will occur. If this does not occur, and the new antenna remains selected for a predetermined time period, a threshold will be established and switching back to the original antenna circuit will occur only after received signal strength indication (RSSI) on the new antenna circuit falls below the threshold value (T). The logic for this particular arrangement requires that a comparison be made between current strength readings and signal strength readings made previously on the non-selected antenna circuit as set out on the first page of Reference I, illustrating the primary algorithm.

It is noted that with this approach the maximum gain theoretically available based upon actual measurements is not available since sensing on both antenna circuits cannot be carried out at the same time. Further, at high speeds (of either the transmitting or receiving station), substantial fading occurs before the antenna circuits can be switched. Another problem is that as the control system continuously searches between antenna circuits for the highest gain, constant switching between the antenna circuits will take place. The result of this is a substantial loss in the data transmitted (block error probability).

It can be safely assumed that antenna switching will wipe out a couple of bits each time that set switching occurs. Thus, it can be argued that there should be no more than two or three antenna changes per received block of data. With a 10-bit RSSI sampling time (42 samples per block), the probability of changing antennas should only be a few percent. However, the aforementioned switching logic cannot guarantee that this will be the case. Consequently, it is desirable to include a minimum time between antenna switching occurrences.

As previously stated, the aforementioned switching logic is based upon the primary algorithm set out on page 1 of Reference I, and expressed as:

$$R_c - T \leq a*(R_O - T - h)$$

Where $R_c$ is current signal strength reading:

$R_O$ is the last reading on the non-selected antenna circuit;

T is a threshold level;

h is a hysteresis value; and a is a value less than 1, used to represent some fraction of T and based upon the intersection of a criterion line with the $R_c$ axis as illustrated on page 1 of Reference I.

In terms of providing diversity gain over a wide range of signal levels, this algorithm works best when the absolute threshold value T is considerably higher than the average signal value. Under these conditions, the algorithm adapts the effective threshold data to an appropriate level for the detected signal. It has been discovered while using this algorithm that the optimal value of one of its adaption parameters varies with mobile speed. Optimizing for very low speed requires a setting of the adaption parameter which will greatly reduce diversity gains at typical vehicle speeds. Conversely, optimizing for high vehicular speed changes the adaption parameters so that diversity gain at low speeds is lowered.

The threshold level must also be set at a high value to prevent rapid switching back and forth between antenna circuits, degrading the data block error rate. This is especially problematical with CDPD systems. If the primary algorithm of Reference I or switching logic based on this algorithm is to be used, it appears that a low threshold T should be chosen. (Probably 5–10 dB above the AWGN 5% block error point.) However, this setup provides gain only for signal levels immediately above the threshold T. Such an arrangement would not be useful if the noise floor rises, as in the case of co-channel interference. In such a case, the signal strength value would be degraded by the noise before reaching the fixed threshold for antenna switching.

Because the primary algorithm of Reference I and the switching logic based on that algorithm are not very satisfactory for CDPD applications, it is necessary to find an alternative switching logic. Such a logic would use a variable threshold T set relative to some measure of signal strength $R_c$ on the selected antenna. It is also necessary that the system retain the capability of switching back if the signal strength on the new antenna circuit is less than that on the old. The logic of the system must also be arranged so that each fade in signal strength is detected so that the system never uses the same antenna for more than the interval between fades if switching is necessary. The logic of the alternative or simplified algorithm is similar to that of the primary algorithm and expressed as:

$$R_c \leq R_{max} + T - H$$

so that the antenna is switched when this condition is met where $R_c$ is the current signal strength reading on the selected antenna circuit:

$R_{max}$ is a maximum value derived based upon signal strength previously read on the selected antenna circuit since the last switch of antennas;

T is a predetermined threshold value; and,

H is a predetermined hysteresis value.

It is noted that the threshold value T must be set less than zero (in dB) or the system simply switches back and forth between a circuit without accomplishing anything. Thus, it has been determined that a threshold value in the vicinity of −8 to −10 dB is best overall.

It is also noted, as explained on page 8 of Reference I, that setting a maximum dwell time degrades gain at high speeds. By ignoring dwell altogether the operation of the system is simplified. The advantage of this is explained on page 8 of Reference I attached hereto.

In effect, the alternative system monitors only one antenna circuit, the one selected. Switching will be attempted whenever a signal strength degradation of approximately 10 dB is detected. If upon switching to the alternate antenna circuit, a lower signal strength is detected, and an immediate switched back to the original antenna circuit will occur.

Upon initial start-up of the RF circuitry associated with the antenna circuits, $R_{max}$ can be set to a high value, so that a quick peek (switch-over to the alternate or non-selected antenna circuit) will be carried out. After the switch, $R_{max}$ is reset to a value based on the signal strength on the old antenna, the threshold and the hysteresis such that if the signal strength on the alternate antenna circuit is lower than that of the original circuit, switch-back will occur. If not, the alternate antenna circuit will become the selected antenna circuit, and will remain so until substantial fading of detected signal strength mandates an attempt to switch to the other (original) antenna circuit. This original "peek" can be prevented by setting $R_{max}$ to a low value on start up.

The value of $R_{max}$ will be determined from state operation based upon measured signal strength and other considerations. It has already been indicated that the threshold T and the hysteresis H are preferably set to values of −10 dB and 3 dB, respectively. It is noted that the value of $R_{max}$ does not depend upon readings from the non-selected antenna circuit.

Figure 3A:
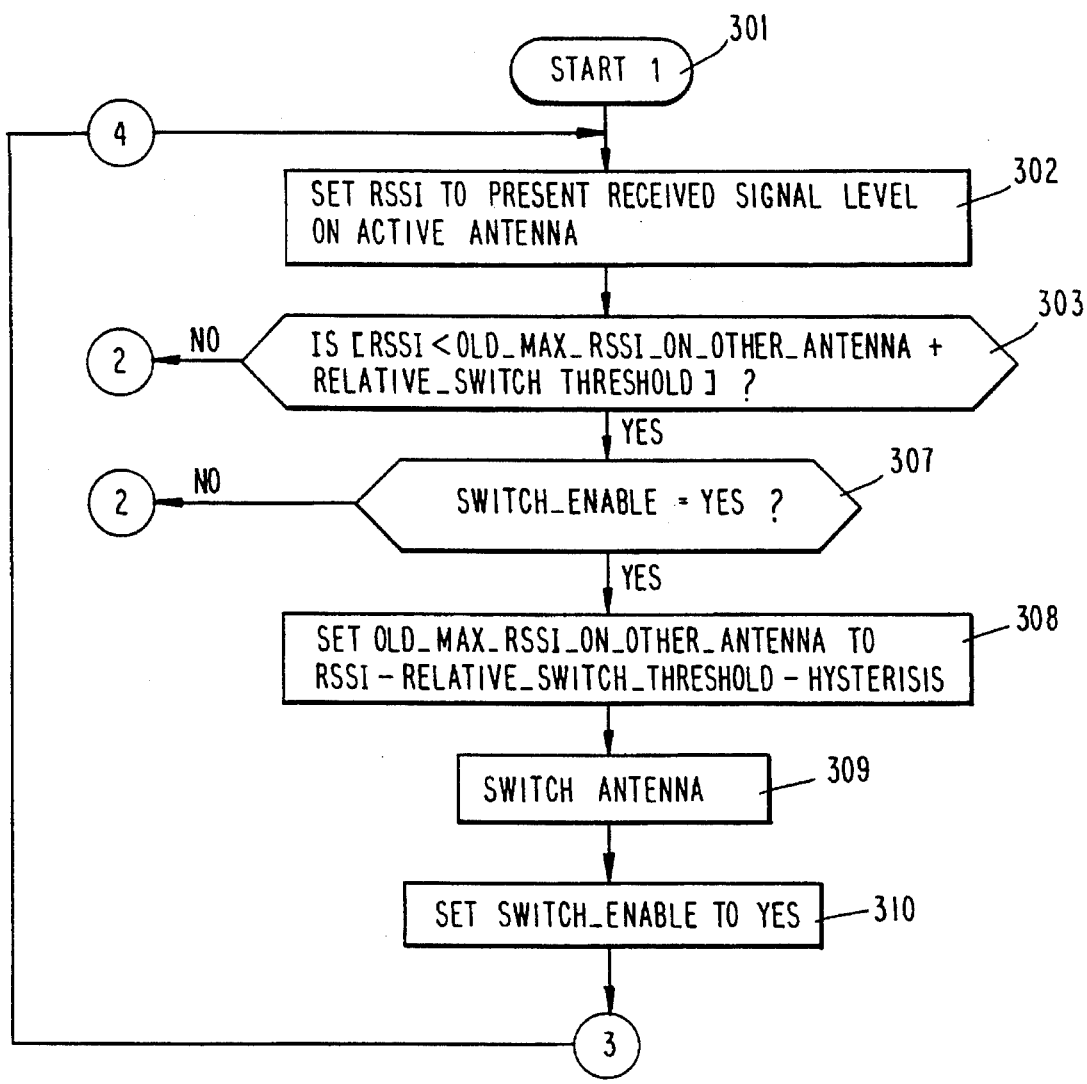
FIGS. 3a and 3b are flow charts illustrating the switching logic of the present diversity system.
Figure 3B:
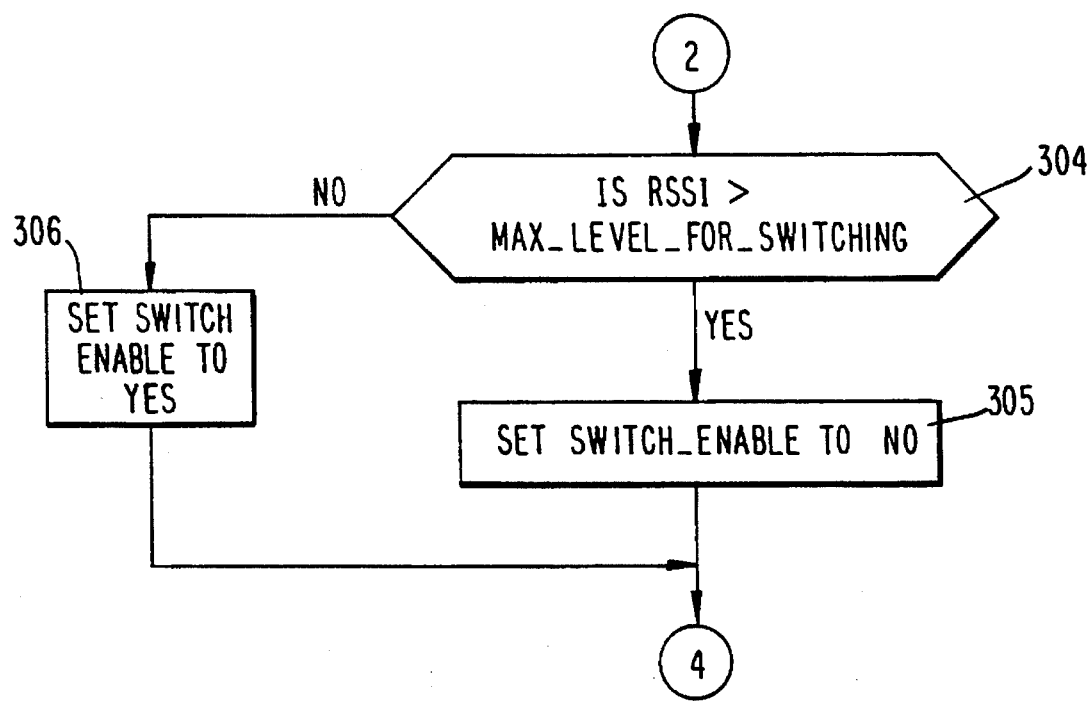

FIGS. 3a and 3b illustrate the switching logic of the present invention. The RF circuitry feeding the antennas is initiated at 301 where antenna 1 has been previously selected. Immediately upon energizing the system, the received signal strength of antenna 1 is measured at step 302. The parameter RSSI is also set to the present received signal level from the active antenna at step 302. Next, at step 303, the RSSI is compared to a quantity constituted by the old maximum RSSI on the other antenna in combination with the relative switch threshold. The first of these parameters is the result of previous measurements and the second is a constant set at −10 dB. If the RSSI is less than the combination of the old maximum RSSI on the other antenna and the relative switch threshold, the process moves as indicated by "circle 2" to step 304 in FIG. 3b. At this step the value of RSSI is compared to the maximum level for switching (a constant set at approximately −70 dB). If RSSI is greater than this value, the process moves to step 305 at which the antenna switch is placed in a state prohibiting switching from the selected antenna to the non-selected antenna. If on the other hand, the RSSI is not greater than the maximum level for switching, the process moves to step 306 and the antenna switch is enabled permitting switching to the non-selected antenna. The process then moves as indicated by "circle 4" to the starting block 301 where the parameter RSSI is set to the present receive signal level.

In the alternative at step 303, when RSSI is less than the combination of the old maximum RSSI on the other antenna plus the relative switch threshold, the process moves to step 307 where a determination is made as to whether the antenna switch is currently enabled. If the antenna switch is enabled the process moves according to "circle 2" and is resumed in FIG. 3b as previously described.

If on the other hand the antenna switch is enabled, the parameter described as old maximum RSSI on the other antenna is changed to the value of the present RSSI (on the selected antenna) less the value of the relative switch threshold and less the value of the hysteresis (a constant of 3.0 dB). The antenna is switched at step 309 and the switch is enabled to permit continued switching at 310. The process then moves according to "circle 3" to "circle 4" where the parameter RSSI is set to the present received signal level.

This process differs from the primary algorithm described. The time between permitted switchovers of antennas is not a part of the process. Further, the old max RSSI on the other antenna is determined based upon the RSSI of the currently selected antenna (less relative switch threshold and hysteresis).

Figure 4:
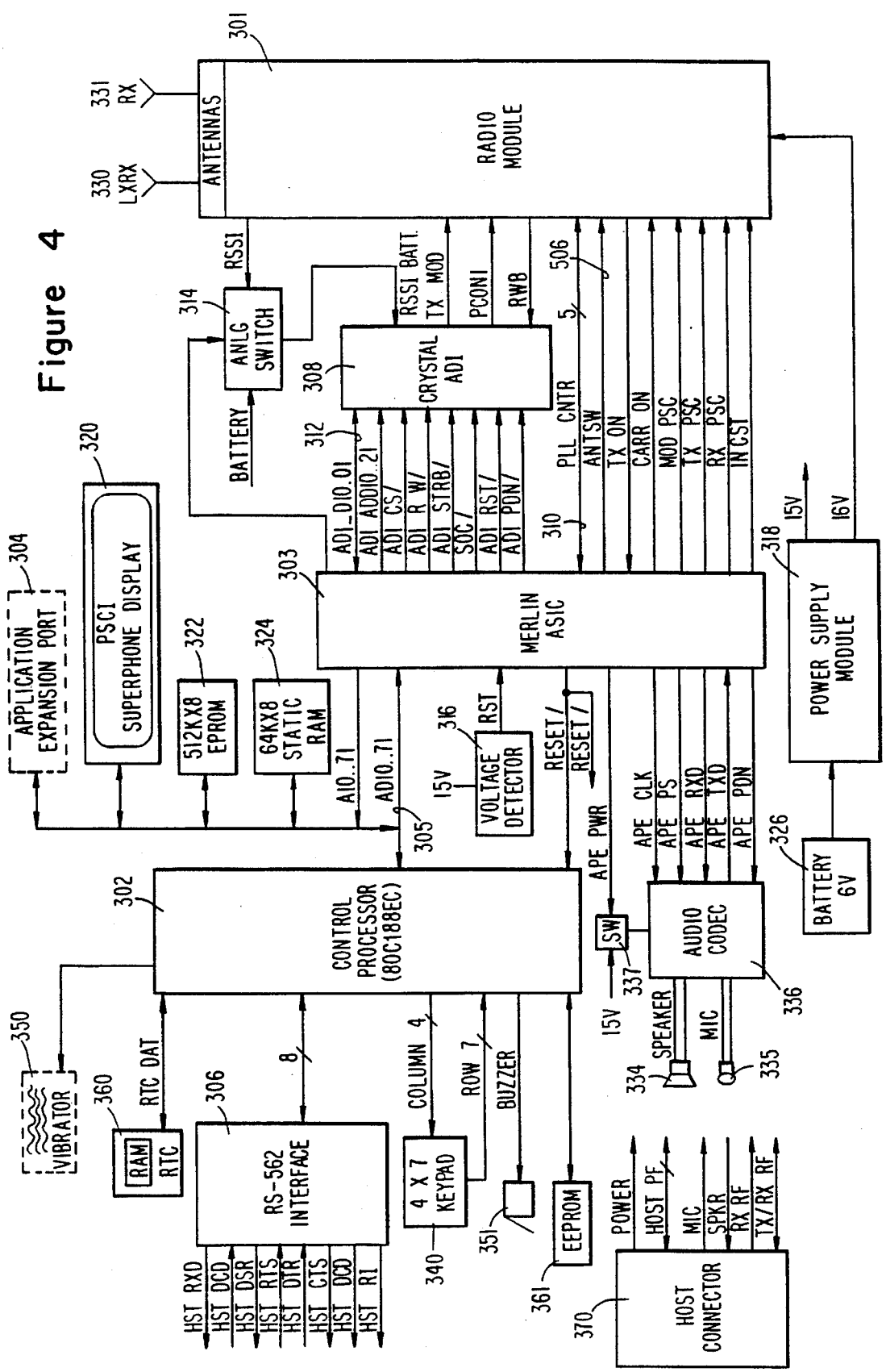
FIG. 4 is a circuit diagram of a different Mobile End System (MES) that integrates the subscriber unit (SU) into a hand held portable data terminal.

FIG. 4 is a more detailed block diagram of the M-ES in U.S. patent application Ser. No. 08/117,913, containing the present invention than that of the M-ES illustrated in FIG. 1. Those portions of FIG. 4 relevant to the present invention are transmit/receive antenna 330 and receive antenna 331. Both of these antennas are connected to their radio module 301 for multiplexed operation. Radio module 301 is fed by power supply 318. A receive signal strength is transmitted from radio module 301 to analog switch 314 through A/D converter 308 and then to processor 303. The aforementioned steps of the antenna diversity method are carried out in processor 303 generating an antenna switching output control signal (ANTSW) sent from processor 303 to radio module 301 to control antenna switching.

Figure 5:
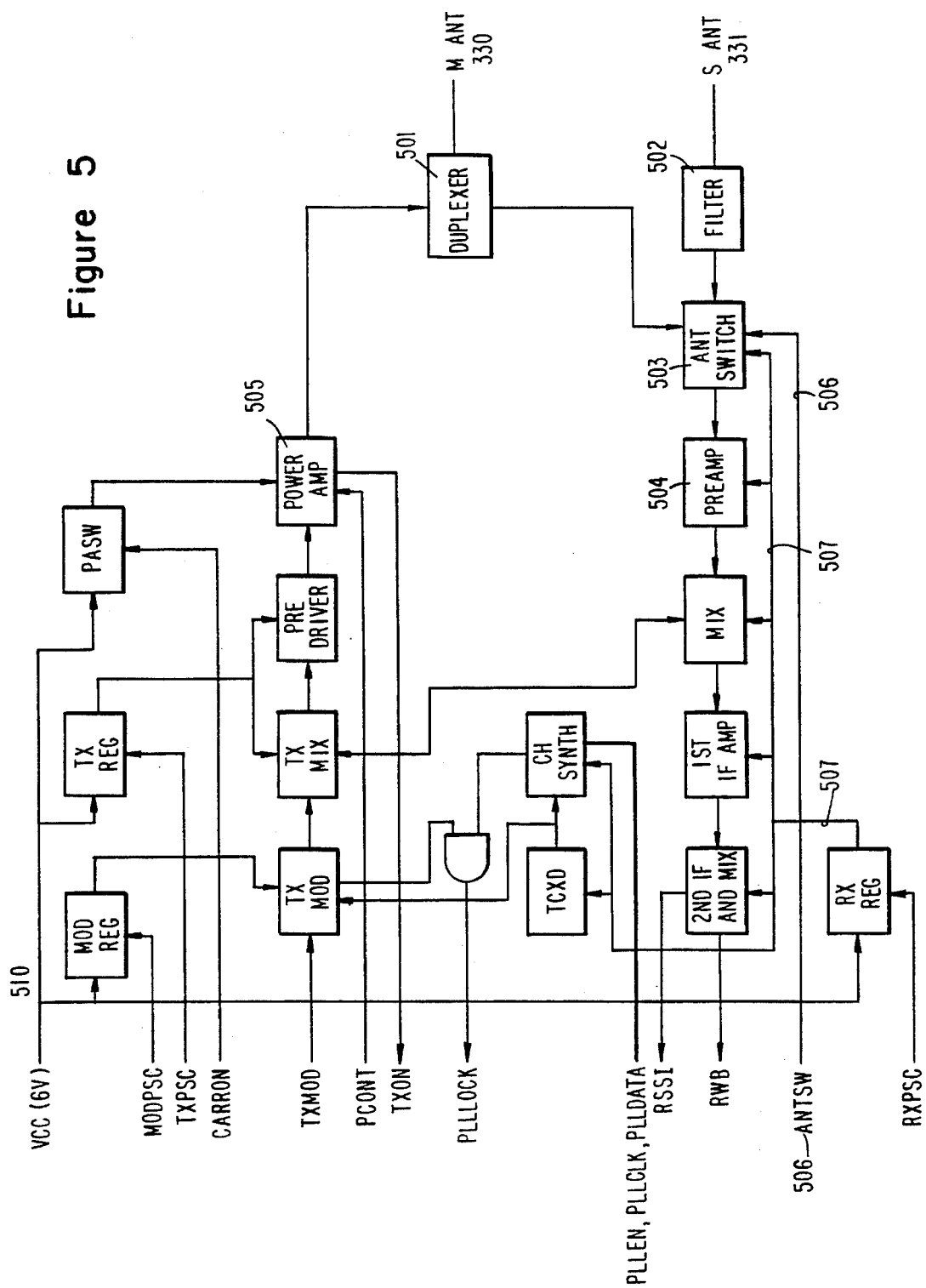
FIG. 5 is a block diagram of RF module 102, 301 in FIG. 1 and FIG. 4.

A more detailed diagram of radio module 301 is illustrated in FIG. 5. Those portions most relevant to the present invention are the connection for receive/transmit antenna 330 and the connection to reception antenna 331. The receive/transmit antenna 330 is connected to duplexer 501 which is fed by power amplifier 505 to complete the transmission circuit. The reception circuit is constituted by the connection between 501 and the antenna switch 503 as well as the connection from the reception antenna 331 which feeds filter 502 which connects to antenna switch 503. The output of antenna switch 503 is used in the reception circuit and feeds pre-amp 504 which provides the input to the radio receiver circuitry. Antenna switch 503 is controlled by antenna switch control line (ANTSW) 506 provided from processor 303. Power is supplied to the antenna switch by means of power line 507 fed by a DC power supply source 510. The other circuit elements contained in RF module 301 are necessary for establishing the transmission/reception radio link but have no special relationship to the antenna diversity system of the present invention.

Figure 6:
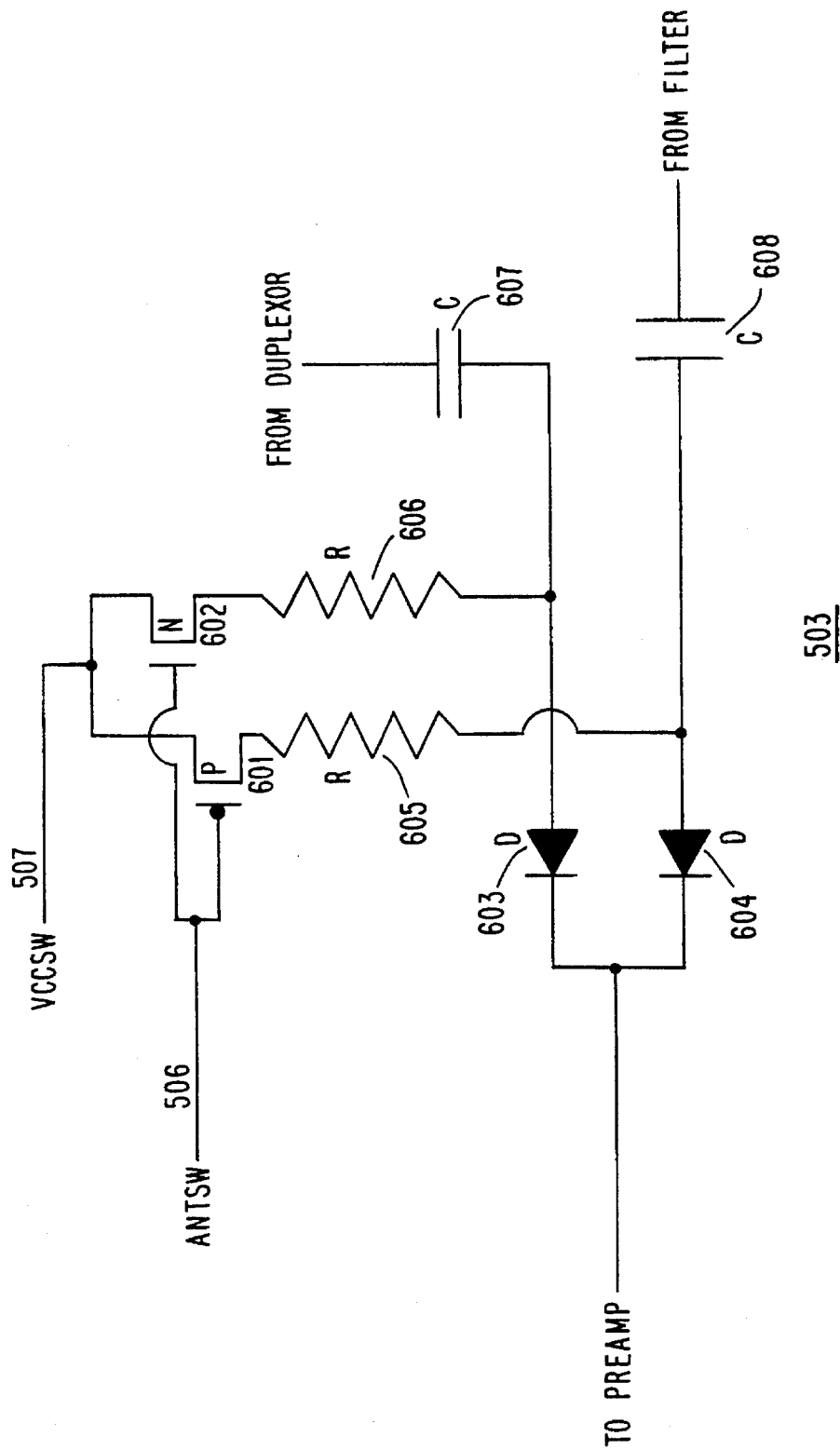
FIG. 6 is a circuit diagram of antenna switch 503 from FIG. 5.

Antenna switch 503 is illustrated in detail by the circuit of FIG. 6. The DC power supply voltage VCCSW 507 is fed to each switch 601 and 602. Transistors 601, 602 are preferably Model No. RN 4906. Appropriate signals from processor 303 will be fed to the gates of each switch 601 and 602, activating one or the other. The output of the activated switch will transfer the power from the power line through one of pull-up resistors 605, 606 to bias one of diode 603, 604. The diode which is biased will complete a reception circuit from either the dedicated reception antenna 331 (fed through filter 502) or from transmit/receive antenna 330 (through duplexer 501). Switches 601, 602 operate on the same control signal however one is normally open while the other is normally closed. Thus when ANTSW 506 is high, switch 602 is closed and switch 601 is open, whereby the receive/transmit antenna 330 is selected. If ANTSW 506 is low, switch 601 is closed and switch 602 is open, whereby the receive antenna 331 is selected. Thus only a simple control signal need be generated by the processor 303 to move from one antenna to another. The switching logic of the present invention is predicated on detecting criterion for switching from one antenna to another. The results of making the aforementioned comparisons always result in a command switch or the absence of a switching command. Thus, the complexity of the control arrangement is minimized.

The most important criterion of antenna diversity for a data transfer system such as CDPD is block error rate, rather than the over all gain. The result of using the alternative algorithm is that at the specified 5% block error probability required for CDPD operation, the gain is 3–4 dB at a speed of 100 KM/H and 6–7 dB at 8 KM/H. As indicated in Reference I, the alternative algorithm provides better results for CDPD use than the primary algorithm.

Instead of using RSSI as previously described, other operational parameters can be used for comparison in carrying out the aforemention simplified algorithm. For example, either bit error rate (BER) or block error rate (BLER) can be used to replace RSSI in the aforementioned method. Nor is the present invention confined to these parameters. Rather, any parameter indicative of signal quality can be used in the subject antenna diversity method instead of RSSI. In another alternative all three of RSSI, BER and BLER can be used together or in any combination as the operative parameter in the aforementioned antenna diversity method.

The aforementioned switching logic and/or algorithm is not necessarily confined to antenna diversity. Rather, the aforementioned technique can be used for evaluating the necessity of hand-off for a mobile end system. Another alternative is the use of the aforementioned technique in a channel hopping scheme both at a mobile end system and for a mobile data base station as desired in the related, co-pending application entitled "CELLULAR DIGITAL PACKET DATA MOBILE DATA BASE STATION". Although different circuitry would be required in each of these alternative embodiments, the logic of the technique could be carried out by any suitable microprocessor, and the switching carried out by the mechanisms normally used for the subject channel hopping and hand-off.

Although a number of arrangements of the present invention have been mentioned by way of example, it is not intended that the invention be limited thereto. For example, the present invention can be used to operate with more than two antennas in adversity scheme. Accordingly, this invention should be considered to include any and all configurations, modifications, variations, combinations or equivalent arrangements falling within the scope of the following claims.

We claim:

1. A method of switching between RF circuits having different characteristics, comprising the steps of:
    (a) detecting a present signal strength of a signal on a selected first RF circuit;
    (b) determining a maximum signal strength value based upon the maximum measured signal strength of previously measured signals input to said selected RF circuit;
    (c) determining a threshold value and an hysteresis value;
    (d) comparing said present signal strength of said signal to a predetermined value comprising the sum of said maximum signal strength value, said hysteresis value and said threshold value; and
    (e) switching from said selected first RF circuit to a second RF circuit if said present signal strength is less than said predetermined value.

2. The method of claim 1, wherein the step of determining said maximum signal strength value includes measuring a first signal strength value detected upon activating said RF circuits.

3. The method of claim 2, further comprising the step of immediately switching between first and second RF circuits upon energizing them.

4. The method of claim 3, further comprising the steps of detecting a second signal strength on said second RF circuit and switching back to said first RF circuit if said second signal strength on said second RF circuit is less than said first signal strength measurement.

5. The method of claim 3, further comprising the step of evaluating said maximum signal value to prohibit said immediate switching to said second RF circuit if said maximum signal strength value is equal to or greater than a second predetermined value.

6. The method of claim 1, further comprising the steps of adjusting said threshold value responsive to changes in the signal strength of said selected first RF circuit.

7. The method of claim 6, wherein switching occurs if a drop in the signal strength of substantially 10 dB occurs for said selected first RF circuit.

8. The method of claim 1, wherein a predetermined time delay is imparted between detecting the signal strength on said selected circuit and switching of said second RF circuit.

9. The method of claim 6, wherein said threshold is set lower than said maximum signal value.

10. An antenna diversity system comprising:
    at least two antennas having different characteristics;
    a switch arranged to select one of said two antennas for active use with an RF circuit;
    a signal strength detector arranged to detect signals received on a selected one of said two antennas; and
    a processor operatively connected to supply said control signals to said switch, said processor comprising:
    means for selecting one of said two antennas by generating control signals for said switch based upon an evaluation of present signal strength on a selected antenna compared to a first predetermined value,
    means for determining a threshold value and a hysteresis value;
    means for selecting a maximum signal strength value based upon maximum signal strength of previous measured signals input to a selected antenna, and
    means for deriving said predetermined value whereas said predetermined value comprises the sum of said maximum signal strength, said threshold value and said hysteresis value.

11. The antenna diversity system of claim 10, wherein said controller further comprises means for initiating an immediate switch-over from a selected antenna to a non-selected antenna upon energizing said antenna diversity system.

12. The antenna diversity system of claim 11, wherein said controller further comprises means for prohibiting said in,mediate switch-over based upon a comparison of present signal strength on said selected antenna with a second predetermined value.

13. The antenna diversity system of claim 10, wherein said antennas are used to provide an RF link between a mobile data base station and mobile subscribers in a cellular digital packet data (CDPD) system.

14. The antenna diversity system of claim 13, wherein said antennas are also connected to an advanced mobile phone system (AMPS), and carry both AMPS and CDPD communications.

* * * * *